United States Patent [19]
Garrett et al.

[11] Patent Number: 5,905,913
[45] Date of Patent: May 18, 1999

[54] SYSTEM FOR COLLECTING A SPECIFIED NUMBER OF PERIPHERAL INTERRUPTS AND TRANSFERRING THE INTERRUPTS AS A GROUP TO THE PROCESSOR

[75] Inventors: Henry Michael Garrett, Raleigh; William G. Holland, Cary; Joseph Franklin Logan; Joseph Gerald McDonald, both of Raleigh, all of N.C.

[73] Assignee: International Business Machines Corporation, Armonk, N.Y.

[21] Appl. No.: 08/842,348

[22] Filed: Apr. 24, 1997

[51] Int. Cl.$^6$ ..................................... G06F 13/14
[52] U.S. Cl. ................. 395/869; 395/733; 395/735; 395/740; 395/741
[58] Field of Search ................. 395/869, 735, 395/733, 741, 740

[56] References Cited

U.S. PATENT DOCUMENTS

| | | |
|---|---|---|
| 4,159,516 | 6/1979 | Henrion et al. .......................... 364/200 |
| 4,247,894 | 1/1981 | Beismann et al. ...................... 364/200 |
| 4,779,195 | 10/1988 | James ....................................... 364/200 |
| 5,426,740 | 6/1995 | Bennett .................................... 395/325 |
| 5,448,743 | 9/1995 | Gulick et al. ............................ 395/869 |
| 5,448,744 | 9/1995 | Eifert et al. .............................. 395/800 |
| 5,481,724 | 1/1996 | Heimsoth et al. .................. 395/200.01 |
| 5,530,891 | 6/1996 | Gephardt .................................. 395/800 |
| 5,535,380 | 7/1996 | Bergkvist, Jr. et al. ................. 395/550 |
| 5,555,383 | 9/1996 | Elazar et al. ............................. 395/306 |
| 5,555,430 | 9/1996 | Gephardt et al. ....................... 395/800 |
| 5,708,814 | 1/1998 | Short et al. .............................. 395/733 |
| 5,717,870 | 2/1998 | Dobson ................................... 395/250 |

*Primary Examiner*—Thomas C. Lee
*Assistant Examiner*—Douglas Rupert
*Attorney, Agent, or Firm*—Joscelyn G. Cockburn

[57] ABSTRACT

An interrupt mechanism associated with a peripheral devise is connected to a processor by an interrupt driven I/O bus. The mechanism includes an n input System Interrupt Status Register (SISR) which collects up to n different interrupts from the device during a predetermined time period. Gate and timing circuits under control of signals provided by the processor regulate the frequency of the interrupts thus reducing the number of interrupt operations required to service the device.

10 Claims, 2 Drawing Sheets

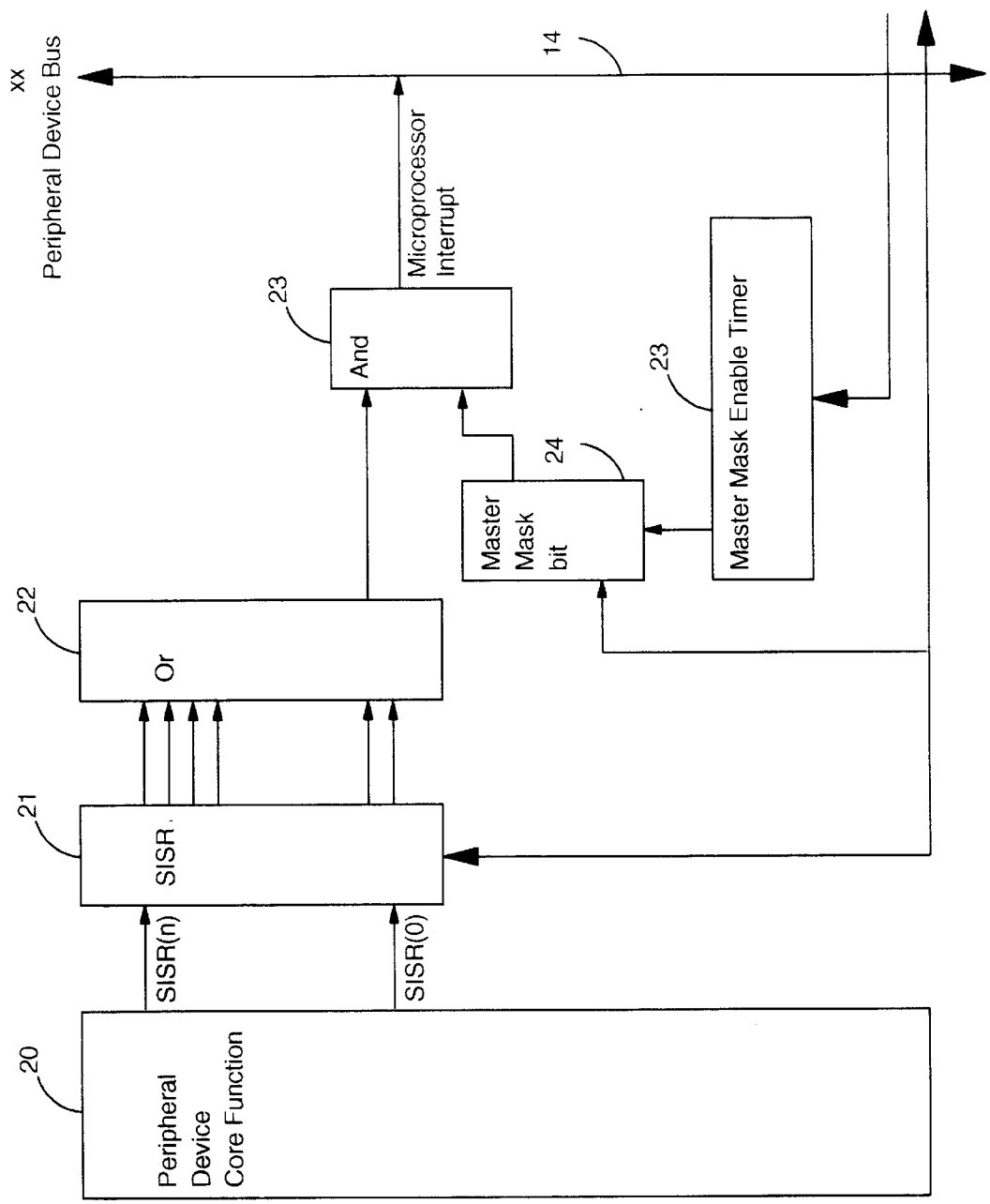

SYSTEM FOR COLLECTING A SPECIFIED NUMBER OF PERIPHERAL INTERRUPTS AND TRANSFERRING THE INTERRUPTS AS A GROUP TO THE PROCESSOR

BACKGROUND

Field of the Invention

Advances in the design and fabrication of microprocessors in the past few years has resulted in a dramatic increase in processor speeds. In fact average speeds have increased more than four fold in the last decade alone. At the same time peripheral input/output busses have remained substantially constant. For example, the Industry Standard Architecture (ISA) bus operates at 8 MHz while many microprocessors operate in the 100–200 MHz range.

As the discrepancy in speed increases, it has become unfeasible to directly connect the I/O bus to the microprocessor. PC (Personal Computer) developers have solved this problem by providing "bridge modules" which disconnect the microprocessor/memory from the I/O bus. While this greatly improves the performance of the microprocessor when it is working from memory or cache, it typically does so at the expense of the microprocessor I/O bus interface. In today's PC environment it is typical for a microprocessor to wait 100 or more processor cycles for each I/O bus access.

Under these conditions the amount of time the microprocessor spends handling devices attached to the I/O bus can significantly impact the microprocessor's performance. Many high speed peripheral devices, such as disk drives and network controllers, are designed to be bus masters which allows these devices direct memory access (DMA). This moves the burden of data movement to the peripheral from the microprocessor resulting in an improvement in the utilization of the microprocessor bandwidth. However, microprocessor communication with peripheral devices still remains a major area for improvement.

Most peripheral component devices communicate with the microprocessor over a relatively slow (ISA), interrupt driven input/output bus. The device signals the microprocessor that it needs service by driving a bus interrupt signal active and waiting for the processor to provide service. A typical sequence includes the steps listed below:

1. the processor stores in memory all necessary information (data, status, etc.) relative to the current operation it is performing (typically a user application);
2. the processor reads from memory all information necessary to service the interrupt;
3. processor sequentially queries each device on the indicated interrupt to ascertain which needs service;
4. The interrupt routine will require multiple I/O bus accesses to fully service the request; and
5. after the interrupt request, the processor must reverse steps 1 and 2 in order to resume processing the interrupted operation.

The above sequence is generally referred to as context switching and can consume thousands of processor clock cycles for every generated interrupt. In those instances where there are many connected peripheral devices each generating many service interrupts, the processor has little time, if any, to service resident user applications.

SUMMARY OF THE INVENTION

The invention contemplates an efficient method for interrupting a processor connected to a peripheral device, an input output bus (I/O bus) and includes the following steps executed after the initiation of an interrupt cycle:

collecting up to n interrupts during a period of time during which interrupt activation is inhibited;

following said period of time, enabling interrupt activation and activating the interrupt process if any interrupts have been collected;

upon activation of the interrupt process transferring the collected interrupts to a processor for processing;

disabling further activation of an interrupt process after transferring the previously collected interrupts to the processor for processing;

collecting interrupts occurring subsequent to the transfer of the previously collected interrupts; and enabling further activation of the interrupt process a predetermined time after the said processor completes processing the interrupts previously transferred.

An object of the invention is to limit the maximum rate which interrupts can be generated by a peripheral device without adding any delay to the presentation of interrupts occurring at a rate below the maximum. Another object of the invention is to minimize the number of interrupts generated by a peripheral device. Still another object is to minimize the number of operations a microprocessor must perform to service the peripheral device interrupts.

BRIEF DESCRIPTION OF THE DRAWINGS

FIG. 2 is a block diagram illustrating an implementation of the invention.

DETAILED DESCRIPTION OF THE INVENTION

Figure 1:
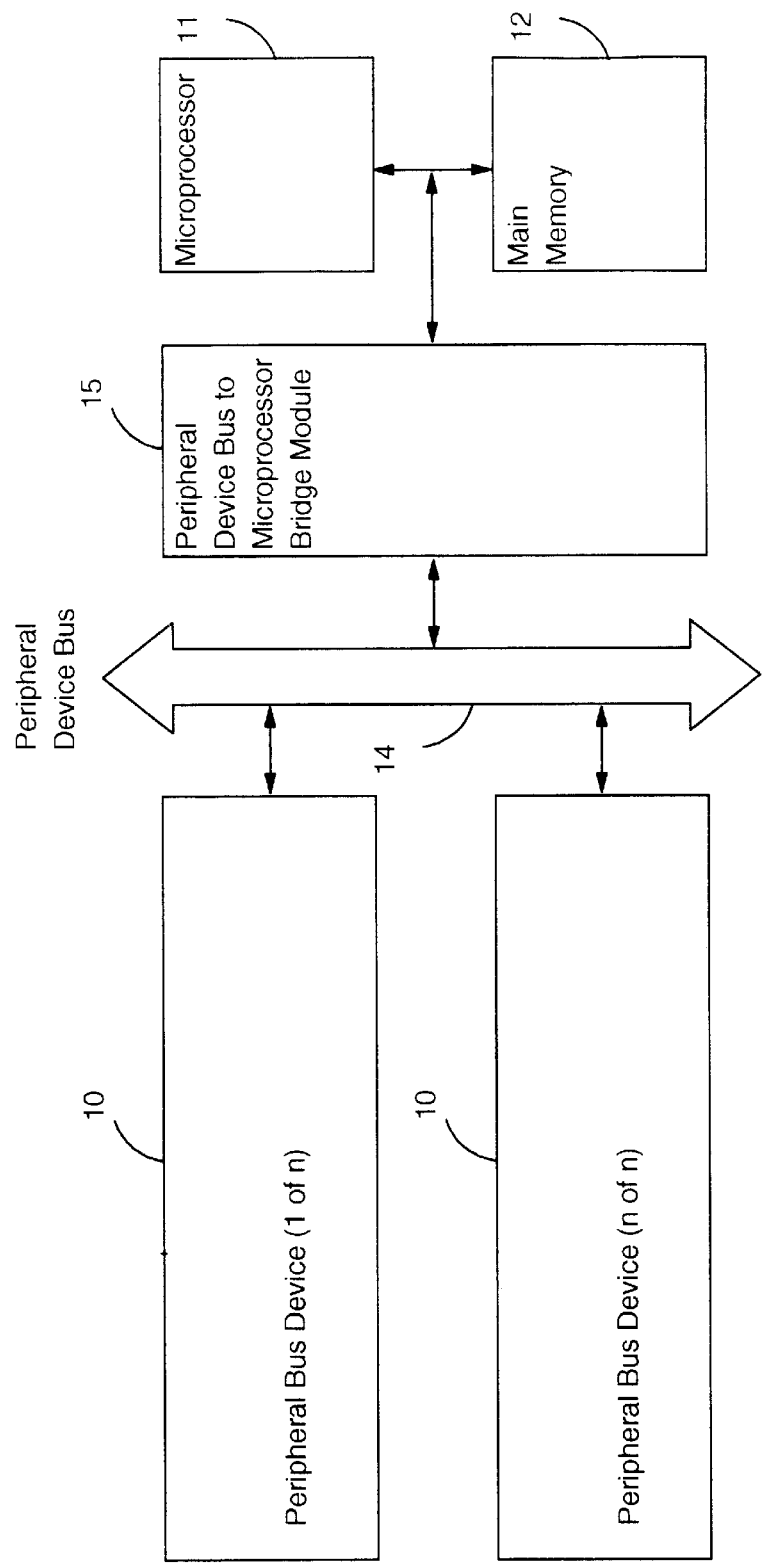
FIG. 1 is a block diagram illustrating the environment in which the invention is used.

In FIG. 1, n peripheral devices 10 are connected to a microprocessor 11 and a main memory 12 by an input/output (I/O) bus 14 and a bridge module 15. All of the physical components illustrated in FIG. 1 (except for peripheral device 10 which is illustrated in detail in FIG. 2) are conventional and available from a number of sources.

Peripheral device 10, illustrated in FIG. 2, includes all conventional core functions shown as a single block 20, and other components described in detail below for executing an efficient interrupt procedure.

An n position System Interrupt Status Register (SISR) 21 is connected to device core function 20 which can set any number of n different interrupt condition bits. The n outputs of SISR register 21 (each corresponding to one of the n inputs) are readable by the processor via I/O bus 14. They are also combined in an or circuit 22 which has its output connected to one input of an and gate 23. The output of and gate 23 is connected to the microprocessor interrupt line in the bus 14.

The other input of and gate 23 is connected to a master mask bit circuit 24 which is controlled by the microprocessor 11 as will be described below. A master mask enable timer circuit 25, also under control of the microprocessor 11, activates the master mask circuit 24 after the master mask enabler timer 25 has expired.

During each interrupt operation the microprocessor 11 reads the contents of the SISR register 21 so it can process all of the interrupts registered since the last interrupt service. It resets the SISR register 21 and the master mask bit circuit 24. This prevents any interrupts subsequent to those serviced in the current operation from activating the processor 11 interrupt line.

In addition it starts the master mask timer circuit 25 when the processing of the interrupts has been completed or at such other time as may be appropriate for different operating circumstances. After the timer expires master mask bit circuit 24 is set and gate 23 is enabled which allows another interrupt operation to take place provided the peripheral device core function 20 has set one or more positions in the SISR 21.

By adjusting the start and/or length of timer 25, the processor 11 can regulate the frequency of the interrupts. In addition, a different time interval can be set into master task timer 25 for different peripheral devices 10 depending upon device and or system requirement.

The physical embodiment of the invention described above is illustrative of one implementation of the method contemplated by this invention. In practice the method includes the following steps:

collecting up to n interrupts during a period of time during which interrupt activation is inhibited;

following said period of time, enabling interrupt activation and activating the interrupt process if any interrupts have been collected;

upon activation of the interrupt process transferring the collected interrupts to a processor for processing;

disabling further activation of an interrupt process after transferring the previously collected interrupts to the processor for processing;

collecting interrupts occurring subsequent to the transfer of the previously collected interrupts; and enabling futher activation of the interrupt process a predetermined time after the said processor completes processing the interrupts previously transferred.

We claim:

1. In a system including a microprocessor connected to a peripheral device by an interrupt driven peripheral device input output bus a method including the following acts:

following the initiation of an interrupt cycle initiated by said peripheral device;

collecting up to n interrupts issued by said peripheral device during a period of time during which interrupt activation by the device is inhibited wherein said collecting includes said peripheral device setting any number of n different interrupt conditions bits in an n storage position register mounted on said peripheral device;

following said period of time, enabling interrupt activation by the device and activating the interrupt process if any interrupts have been collected;

upon activation of the interrupt process transferring on an input/output bus the collected interrupts to the processor for processing;

disabling further activation of an interrupt process by the device after transferring the previously collected interrupts to the processor for processing;

collecting interrupts, using the n-position register, occurring subsequent to the transfer of the previously collected interrupts; and enabling further activation of the interrupt process by the device a predetermined time after the said processor completes processing the interrupts previously transferred.

2. In a system including a microprocessor connected to one or more peripheral devices by an interrupt driven peripheral device input output bus a method including the acts of:

following the initiation of an interrupt cycle initiated by one of said peripheral devices;

collecting up to n interrupts issued by said peripheral device during a period of time during which interrupt activation by the device is inhibited wherein said collecting includes said peripheral device setting any number of n different interrupt condition bits in an n storage register position;

following said period of time, enabling interrupt activation by the device and activating the interrupt process if any interrupts have been collected;

upon activation of the interrupt process transferring on an input/output bus the collected interrupts to a processor for processing;

disabling further activation of an interrupt process by the device after transferring the previously collected interrupts to the processor for processing;

using the n-bit register to collect interrupts occurring subsequent to the transfer of the previously collected interrupts; and enabling further activation of the interrupt process by the device a predetermined time after the said processor completes processing the interrupts previously transferred.

3. The method set forth in claim 2 in which the predetermined time between the termination of processing of an interrupt and the enablement of activation of the interrupt process can be set at a unique value for each peripheral device connected to the peripheral device input output bus to accommodate different peripheral device operating characteristics.

4. In a system including a microprocessor connected to a peripheral device by an peripheral device input output bus (I/O bus) having data and interrupt lines, an interrupt mechanism for receiving interrupt requests from the peripheral device and transferring them to the processor via the interrupt line for processing comprising:

a System Interrupt Status Register (SISR) system having n storage positions each adapted for receiving a different interrupt status from the said peripheral device and providing a first output indicating if any stored status requires an interrupt;

means responsive to first signals received from the processor for transferring the contents of the SISR register to the processor via the I/O bus and resetting the SISR register; and a Master Mask Bit Circuit under control of said first signals received from the said processor for inhibiting transmission of interrupt signals from the first output of the said SISR system to the said interrupt line contemporaneous with the resetting of the said SISR and responsive to second signals received from the said processor for enabling transmission of interrupt signals to the processor via the interrupt line after a predetermined time delay.

5. In a system including a microprocessor connected to a peripheral device by peripheral device input output bus (I/O bus) having data and interrupt lines, an interrupt mechanism for receiving interrupt requests from the peripheral device and transferring them to the processor via the interrupt line for processing comprising:

a System Interrupt Status Register (SISR) system having n storage positions each adapted for receiving a different interrupt status from the said peripheral device and providing a first output indicating if any stored status requires an interrupt;

means responsive to first signals received from the processor for transferring the contents of the SISR to the processor via the I/O bus and resetting the SISR;

gate means under control of said first signals received from the said processor for inhibiting transmission of interrupt signals from the first output of the said SISR system to the said interrupt line contemporaneous with the resetting of the said SISR and responsive to second signals received from the said processor for enabling transmission of interrupt signals to the processor via the interrupt line after a predetermined time delay; wherein said gate means includes an and gate having an output connected to the I/O bus interrupt line, a first input coupled to the first output of the SISR and a second input connected to a master mask circuit which is reset by the said first signals to first state for inhibiting the said and gate; and a master mask enable timer circuit responsive to the said second signals provided by the processor for setting the master mask circuit to a state which enables the said and gate after a predetermined time delay.

6. The system of claim 4 further including an and gate having an output connected to the I/O bus interrupt line, a first input coupled to the first output of the SISR system and a second input connected to the master mask circuit; and a master mask enable timer circuit having an output coupled to the master mask circuit and responsive to the said second signals provided by the processor for setting the master mask circuit to a state which enables the said and gate after a predetermined time delay.

7. In a system including a microprocessor connected to a peripheral device by a peripheral device input output bus (I/O bus) having data and interrupt lines, an interrupt mechanism for receiving interrupt requests from the peripheral device and transferring them to the processor via the interrupt line for processing comprising:

a System Interrupt Status Register (SISR) system, disposed on said peripheral device, having n storage positions each adapted for receiving a different interrupt status from the said peripheral device and providing a first output indicating if any stored status requests an interrupt;

means responsive to first signals received from the processor for transferring the contents of the SISR to the processor via the I/O bus and resetting the SISR;

a Master Mask Bit Circuit providing a first output indicating if interrupt generation on the I/O bus interrupt line is disabled;

means under control of said first signals received from said processor for setting the Master Mask Bit Circuit so as to disable interrupt generation from the device contemporaneous with the resetting of the said SISR; and a Master Mask Enable Timer responsive to said first signals received from the processor for re-enabling the Master Mask circuit after a predetermined built-in time delay.

8. The interrupt limiting mechanism of claim 7 further including an And Gate having an output connected to the I/O bus interrupt line, a first input connected to the first output of the SISR system and a second input connected to the first output of the Master Mask.

9. An assembly for use in a computer system including:

a peripheral device including a peripheral device core function;

a System Interrupt Status Register (SISR) disposed on said peripheral device and coupled to the peripheral device core function, said SISR including n storage positions each adapted for receiving a different interrupt status and outputting a signal representative of its setting;

an OR circuit coupled to the SISR and providing a first output indicating if any stored status requires an interrupt;

an and circuit having a first input coupled to the OR circuit, a second input and an output, a Master Mask Bit Circuit having an output coupled to the second input of the and circuit;

a first signal line connected to the SISR and the Master Mask Bit Circuit, said first signal line, if activated, carries a first signal that causes a transfer of information from said SISR, simultaneously resetting said SISR and driving the output of said Master Mask Bit Circuit to a predetermined state;

a Master Mask Enable Timer having an output coupled to the Master Mask Bit Circuit; and a second signal carrying conductor connected to the Master Mask Enable Timer.

10. In a system including a microprocessor connected to a peripheral device by an peripheral device input output bus (I/O bus) having data and interrupt lines, an interrupt mechanism for receiving interrupt requests from the peripheral device and transferring them to the processor via the interrupt line for processing comprising:

a System Interrupt Status Register (SISR) system having n storage positions each adapted for receiving a different interrupt status from the said peripheral device and providing a first output indicating if any stored status requests an interrupt;

means responsive to first signals received from the processor for transferring the contents of the SISR to the processor via the I/O bus and resetting the SISR;

a Master Mask Bit Circuit providing a first output indicating if interrupt generation on the I/O bus interrupt line is disabled;

means under control of said first signals received from said processor for setting the Master Mask Bit Circuit so as to disable interrupt generation from the device contemporaneous with the resetting of the said SISR;

a Master Mask Enable Timer responsive to second signals received from the processor for re-enabling the Master Mask Bit Circuit after a predetermined built-in time delay; and an And Gate having an output connected to the 1/O bus interrupt line, a first input connected to the first output of the SISR system and a second input connected to the first output of the Master Mask.

* * * * *